Patented Apr. 1, 1930

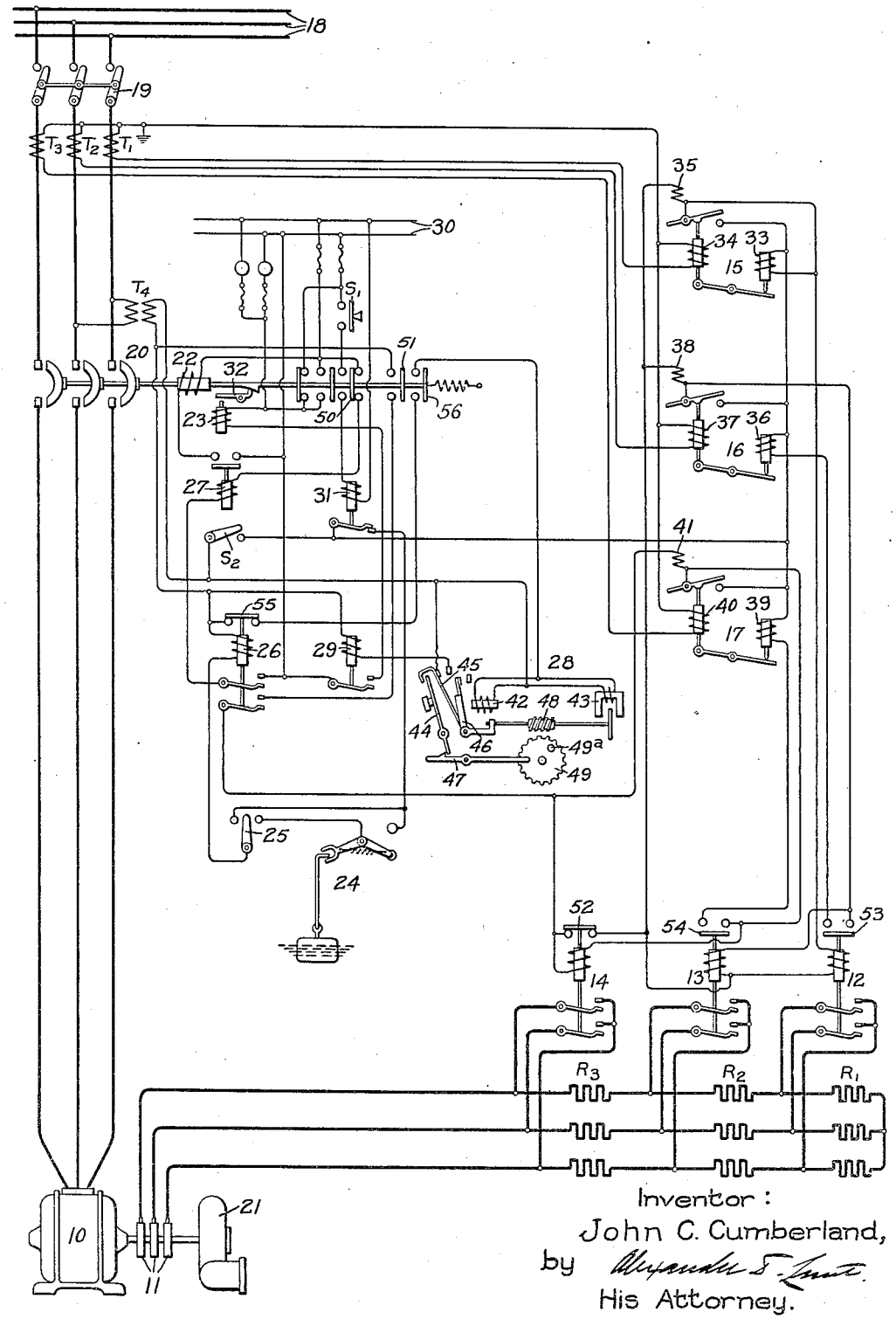

1,752,892

UNITED STATES PATENT OFFICE

JOHN C. CUMBERLAND, OF SCHENECTADY, NEW YORK, ASSIGNOR TO GENERAL ELECTRIC COMPANY, A CORPORATION OF NEW YORK

MOTOR CONTROL

Application filed May 18, 1926. Serial No. 109,844.

This invention relates to the control of electric motors, particularly those employed in service where it is desirable that the operating speed of the motor be reduced before the motor is stopped.

The object of the invention is to provide an improved control system for motors employed in service of the above character that is capable of starting the motor as well as automatically accelerating the motor, and at the same time insures that the operating speed of the motor is reduced to a desired value for a time interval before the power connections of the motor are interrupted.

Although of general application, a control system embodying my present invention is of particular utility in controlling electric motors employed in pumping service where the pump inlet or outlet pipe line is of considerable length. In such service serious difficulty may be experienced with water hammer in case the pump driving motor is suddenly stopped after operation at full running speed. However, with my improved control system the running speed of the motor is reduced automatically to a sufficiently low value for a limited period prior to the actual stopping of the motor that water hammer is effectively overcome. Thus whether the pump driving motor is started and stopped due to operation of an automatic float switch or under the control of an operator, my present invention always insures a period of slow speed operation prior to the final interruption of the motor power connections.

Briefly, in carrying my invention into effect in a preferred form, I provide a time element device for delaying the interruption of the motor power connections for a time interval after operation of a manually or automatically operated control switch for stopping the motor. The arrangement is such that upon operation of the manual or automatic control switch to stop the motor, the motor speed controlling device or switches at once are operated to reduce the motor speed to the desired value and the time element device then functions to effect the opening of the motor line switch after a suitable period of low speed operation of the motor.

In the accompanying drawing, the single figure diagrammatically illustrates a combined manual and automatic float switch pumping motor control system embodying a preferred form of the invention.

Referring to the drawing, the motor 10 is shown as of the ordinary three phase alternating current induction type having the speed-controlling resistors $R^1$, $R^2$, $R^3$, connected in the secondary circuit of the motor through the slip rings 11. The speed-regulating resistors are controlled to accelerate and decelerate the motor by the electromagnetic switches or contactors 12, 13, 14, which in turn are under the control of the accelerating current limit relays 15, 16, 17. These relays are energized in accordance with the motor line current through the agency of the current transformers $T^1$, $T^2$, $T^3$.

Power is supplied to the motor 10 from suitable three phase supply lines 18, through the disconnecting switch 19 and the electrically controlled line switch 20 which is biased to the open position by a suitable spring as shown or by any other suitable means. The motor 10 is shown as connected to drive the centrifugal pump 21, which may have either an outlet or inlet such as to be subject to water hammer in case motor 10 is suddenly stopped when operating at full running speed.

The line switch 20 is shown as of the latched-in type and is provided with the closing winding 22 and the latch tripping winding 23. The closure of the line switch, as well as the operation of the motor accelerating switches 12, 13, 14, is automatically controlled by the master switch 24. As shown, the master switch 24 is of the float operated type and the selective switch 25 is provided for transferring the control of the operation of motor 10 to the automatic float switch 24 or for manually starting and stopping operation of the motor if desired. As will be described more in detail hereinafter, the master switch 24, as well as the selective switch 25, operates through the agency of the relays 26 and 27 to control the energization of the line switch closing winding 22 and also the energization and deenergization of the motor accelerating switches 12, 13, 14.

In accordance with my present invention, the opening of the line switch 20 is placed under the control of an electroresponsive time element device 28, which is arranged to effect the opening of the line switch 20 a predetermined time interval after the opening of the master switch 24 or the selective switch 25 and the resulting deenergization of the accelerating switches 12, 13, 14. In this way motor 10 is maintained connected to the supply lines for operation at reduced speed with the resistors $R^1$, $R^2$, $R^3$, in the secondary circuit of the motor for a desired period after the operation of the master switch 24 or the selective switch to effect the stopping of the motor. The resulting decrease in speed and output of the pump 21 serves to gradually decrease the flow through the pump and thereby effectively prevent water hammer in the inlet or discharge pipe line of the pump.

The time element device 28 for delaying the interruption of the motor power connections is shown as of the form fully described and claimed in the copending patent application of Hugh M. Stephenson, Serial No. 745,028, filed October 21, 1924, although my present invention is not necessarily limited to the particular form of time element device shown.

The operation of the control system illustrated is as follows: With the power supply lines 18 energized from a suitable three phase source and the disconnecting switch 19 and the safety switch $S^2$ closed, the selective control switch 25 is operated to the right to place the starting and stopping of the motor 10 under the control of the float switch 24. The control power supply lines 30 are energized from a suitable source of direct current. Under these conditions, whenever the float switch 24 is operated to the circuit-closing position, an energizing circuit for the relay 26 is completed from the lower terminal of the potential transformer $T^4$ through the winding of relay 26, selective switch 25, float switch 24, the normally closed relay 31, and the safety switch $S^2$ to the other terminal of the transformer. The resulting closure of relay 26 establishes a circuit extending from the lower control supply line 30 through the upper contact of the relay 26, thence through the operating winding of relay 27, and the interlocking contact 50, to the upper supply line 30. This results in the closure of the contacts of relay 27 to connect the closing winding 22 of the line switch across the direct current supply lines 30 and the closing winding operates the line switch to the closed position wherein it is mechanically held by the latch 32. Upon closure of the line switch the auxiliary interlocking contact 50 disengages its right hand contacts to interrupt the circuit of relay 27 and engages with its left hand contact to partially complete a circuit to place the relay 31 under the control of the normally open manual stop push button $S^1$.

Upon closure of the motor line switch in the manner just described the motor 10 is energized from the supply lines 18 with all of the speed regulating resistors $R^1$, $R^2$, $R^3$, connected in the secondary circuit of the motor. The motor at once starts operation of the pump 21 at slow speed and with full starting torque. The automatic operation of the switches 12, 13, 14, to successively remove the resistors $R^1$, $R^2$, $R^3$, from the secondary circuit of the motor is controlled in accordance with the line current of motor 10 as follows: Closure of the line switch 20 completes an energizing circuit for the voltage winding 33 of electroresponsive relay 15 extending from the lower terminal of potential transformer $T^4$ through the auxiliary contact 51 of the line switch, the lower contact of relay 26, thence through the contact 52 of the resistance controlling switch 14, the operating winding of switch 12, the voltage winding 33 of current limit relay 15 and through the safety switch $S^2$ to the other terminal of the potential transformer. The current flow in the circuit is insufficient to operate the switch 12, although of ample value to lift the plunger or armature of the voltage-responsive winding 33. This places the closing of the contact of current limit relay 15 under the control of the current responsive winding 34, which is energized in accordance with the current of motor 10 by means of the current transformer $T^1$. Thus, when the initial inrush of starting current to the motor has subsided to a desired value, the energization of winding 34 is decreased sufficiently to permit closure of the contact of relay 15. As soon as the relay 15 closes its contact, the voltage winding 33 is short-circuited thereby increasing the energization of the operating winding of switch 12 to full value. Switch 12 responds to remove the resistors $R^1$ from the secondary circuit of the motor 10. Closure of relay 15 also serves to energize the relay holding winding 35 in parallel circuit with the winding of switch 12 and the winding 35 maintains the relay contact firmly in the closed position.

The current limit relay 16 next functions to control the energization of the resistance controlling switch 13 in accordance with the line current of motor 10 in substantially the same manner. In this case the energizing circuit of the voltage-responsive winding 36 of the relay is completed upon the closure of contact 53 on switch 12. The current-responsive winding 37 and the holding winding 38 function to control the closure of relay 16 and the relay controls the operation of switch 13 in the manner previously described. Likewise, upon the closure of switch 13 the contact 54 establishes an energizing circuit for the voltage winding 39 of relay 17 and the current-responsive winding 40, the holding winding 41, then control the operation of the relay contact to operatively energize the winding of switch 14 in a similar manner. In this way the successive resistors R¹, R², R³, are removed automatically from the secondary circuit of the motor 10 to bring the motor up to full running speed.

The stopping of motor 10 under the control of the float switch 24 with a period of slow speed operation before the motor circuit is finally interrupted, is accomplished in the following manner: When the float switch is operated to the open position the energizing circuit of relay 26 is interrupted and the relay at once returns to the open position. This results in the interruption of the energizing circuits for the several resistance controlling switches 12, 13, 14, as well as of the holding windings and voltage windings of the relays 15, 16, 17, all of which extend through the lower contact of relay 26. Consequently, the resistance controlling switches 12, 13, 14, at once operate to reinsert the resistors R¹, R², R³, in the secondary circuit of the motor to bring the motor to its lowest operating speed. At the low speed the output of pump 21 is materially reduced to such a value that no appreciable water hammer is developed in the pumping system when the motor is finally stopped.

The low speed operation of motor 10 is continued for a desired period, since in accordance with my invention, the time element device 28 delays the interruption of the power connections of the motor 10 for a predetermined time interval after the reinsertion of the resistors R¹, R², R³, in the secondary circuit. The time element device 28 as diagrammatically illustrated, comprises an operating electromagnet 42 and a timing motor 43 of the induction disk type and operates the arm 46 to close the circuit controlling contact member 45 a predetermined time interval after the simultaneous energization of the operating windings of the operating electromagnet 42 and the timing device 43. The timing device cooperates with the float switch 24 to delay the operation of line switch 20 to stop the motor as follows: Upon the opening of float switch 24 and the resulting deenergization of relay 26, a circuit is completed by the contact 55 of the relay 26 extending from the lower terminal of the potential transformer T⁴ through contact 55, contact 56 on the line switch in the closed position, thence through the windings of the operating electromagnet 42, the timing device 43 in parallel circuit, to the other terminal of the potential transformer. The operating electromagnet 42 at once attracts the armature 46, thereby setting up a strain in the yielding contact 45 tending to close the same and to operate the arm 44. However, movement of the arm 44 and 45 is prevented by the mechanical latch 47. When the armature 46 is attracted, the worm gear 48 on the shaft of the induction disk timing device 43 is carried into mesh with the rotatable disk 49. Thus, the induction disk timing device 43 starts rotation of the disk 49 to carry the tripping pin 49ᵃ into engagement with the latch 47. After the elapse of the time interval required for pin 49ᵃ to effect the tripping of the latch 47, the arm 44 and contact 45 are released. Upon closure of contact 45 the relay 29 is energized from the potential transformer T⁴ and responds to complete an energizing circuit for the motor line switch tripping winding 23 extending from the direct current supply lines 30. The tripping winding 23 at once actuates the latch 32 to release the line switch 20 for operation to the open position in accordance with its bias to thereby interrupt the power connections of motor 10. Upon the opening of the line switch the operating elements of the control system are returned to their respective positions in which they are shown in the drawing preparatory to repeating the cycle of operation in the manner previously described upon reclosure of the float switch 24.

Thus, it will be seen that the improvements provided by my invention insure that the stopping of motor 10 always is preceded by a period of operation at low speed with the speed-regulating resistors in the secondary circuit of the motor. While the control system embodying my present invention is particularly advantageous in the control of pump motors in order to overcome water hammer, it will be evident to those skilled in the art that the invention may be applied with equal advantage in other service.

It may be noted that at any time during full speed operation of motor 10, the relay 26 may be energized to effect the stopping of motor 10 in exactly the manner as previously described either by operation of the selective switch 25 to the off position, or by closure of the stop push button S¹. In the latter case the relay 31 is energized from the direct current supply lines 30 to interrupt the energizing circuit of the relay 26. However, under all conditions the opening of the line switch 20 is delayed by means of the time element device 28 to insure a period of low speed operation of the motor 10 prior to the final stopping thereof.

What I claim as new and desire to secure by Letters Patent of the United States is:

1. In combination in a system of motor control, line switch mechanism for the motor, motor speed regulating means, master switch mechanism for controlling said line switch mechanism to start and stop the motor, electroresponsive means controlled by the master switch mechanism for insuring immediate response of said speed regulating means to effect deceleration of the motor, and electroresponsive time element means under the control of said master mechanism for maintaining said line switch mechanism closed to insure continued operation of said motor at low speed for a predetermined time interval after operation of said master switch mechanism to effect deceleration of said motor.

2. The combination of a variable speed electric motor, means for establishing and interrupting power connections for the motor including motor starting and stopping devices, means dependent upon operation of said stopping device for decelerating the motor to low speed, and an electroresponsive time element device for controlling the operation of said power interrupting means to insure operation of the motor at low speed for a limited period before interruption of the motor power connections after operation of said stopping device.

3. The combination with an electric motor, of switch mechanism for establishing and interrupting the power connections of the motor, independently operable switch mechanism for accelerating and decelerating the motor, means for controlling said switch mechanisms to start and accelerate the motor to full running speed and to stop the motor, and means including a time element device for preventing operation of said first switch mechanism to interrupt the motor connections for a time interval after operation of said independently operable switch mechanism to decelerate the motor.

4. The combination with a variable speed electric motor, of a line switch for controlling the connection of the motor to a source of supply, speed regulating means for controlling the acceleration and deceleration of the motor, and means including a time element device for insuring a delay in the opening of the line switch for a predetermined time interval after the operation of the said means to decelerate the motor.

5. The combination of a variable speed electric motor, a line switch for establishing and interrupting power connections for the motor, switch mechanism for controlling the operating speed of the motor, and an electroresponsive time element device for controlling said line switch to insure operation of the motor at low speed for a time interval before interruption of the motor power connections.

6. The combination of an electric motor, a line switch for establishing and interrupting the power connections of the motor, electroresponsive switch mechanism for automatically controlling the acceleration of the motor in accordance with an electrical characteristic thereof and for decelerating the motor, and means including a time element device for controlling the operation of said line switch to prevent interruption of the motor connections until the expiration of a definite time interval after operation of said electroresponsive switch to decelerate the motor.

7. The combination with a variable speed motor, of a line switch for establishing and interrupting power connections for the motor, a speed-regulating resistor for the motor, means for operating the line switch to start the motor and for controlling said resistor to vary the operating speed of the motor, and means for insuring the continued operation of the motor at a definite slow speed for a predetermined time interval after insertion of said resistor to decelerate said motor, said last mentioned means including a time element device for preventing the opening of said line switch during said time interval.

8. The combination with an alternating current induction motor having a speed-regulating resistor connected in the secondary circuit thereof, of a line switch for establishing and interrupting the power connections of the motor, independently operable switch mechanism for controlling said resistor, electroresponsive means for operating said switch mechanism to accelerate the motor upon closure of the line switch, means for controlling said electroresponsive means to reduce the operating speed of the motor and means including a time element device for preventing the opening of the line switch for a predetermined time interval after the operation of said electroresponsive means to reduce the speed of said motor.

9. The combination with an alternating current induction motor having a speed-regulating resistor connected in the secondary circuit thereof, of an electrically controlled line switch for establishing and interrupting the power connections of the motor, an electroresponsive switch mechanism connected to control said resistor in accordance with an electrical characteristic of the motor to accelerate the motor after closure of the line switch, control switch mechanism for operating said electroresponsive switch to decelerate the motor, and an electroresponsive time element device connected to be set into operation to prevent the opening of said line switch for a predetermined time interval after the operation of said control switch mechanism.

10. The combination with an alternating current induction motor having a speed-regulating resistor connected in the secondary circuit thereof, of an electrically controlled line switch for establishing and interrupting the power connections of the motor, an electroresponsive switch mechanism for controlling said resistor, a master switch and connections controlled thereby for operating the line switch to start the motor and for controlling said electroresponsive switch mechanism to accelerate the motor, and an electroresponsive time element device connected to be set into operation upon the opening of said master switch and arranged to delay the opening of said line switch a predetermined time interval after operation of said electroresponsive switch to decelerate the motor.

11. The combination with a three phase alternating current induction motor having speed-regulating resistors connected in the secondary circuit thereof, of an electrically controlled line switch for the motor, electroresponsive switches for controlling said resistor, a master switch for controlling the closure of said line switch means whereby said electroresponsive switches are controlled to accelerate the motor in accordance with the current of the motor upon closure of the master switch and arranged to decelerate the motor upon the opening of the master switch, and an electroresponsive time element circuit controlling device arranged to be set into operation upon the opening of the master switch and connected to prevent establishment of power connections for opening the line switch for a predetermined time interval after the opening of the master switch.

In witness whereof, I have hereunto set my hand this 15th day of May, 1926.

JOHN C. CUMBERLAND.